United States Patent [19]

Sibley

[11] 4,368,534
[45] Jan. 11, 1983

[54] KEYBOARD CONTROLLED VITAL DIGITAL COMMUNICATION SYSTEM

[75] Inventor: Henry C. Sibley, Adams Basin, N.Y.

[73] Assignee: General Signal Corporation, Stamford, Conn.

[21] Appl. No.: 157,658

[22] Filed: Jun. 9, 1980

Related U.S. Application Data

[63] Continuation of Ser. No. 7,184, Jan. 29, 1979, abandoned.

[51] Int. Cl.³ ............................................. G06F 11/08
[52] U.S. Cl. ................................... 371/53; 364/900; 371/70
[58] Field of Search .......................... 371/53, 54, 70; 364/900

[56] References Cited

U.S. PATENT DOCUMENTS

| | | | |
|---|---|---|---|
| 3,686,629 | 8/1972 | Yu | 371/53 |
| 3,753,225 | 8/1973 | Liddell | 371/53 |
| 3,978,449 | 8/1976 | Sanders et al. | 371/70 |
| 3,995,173 | 11/1976 | Sibley | 307/218 |
| 4,090,173 | 5/1978 | Sibley | 371/70 |
| 4,092,732 | 5/1978 | Ouchi | 371/53 |
| 4,181,849 | 1/1980 | Sibley | 235/92 T |

*Primary Examiner*—Charles E. Atkinson
*Attorney, Agent, or Firm*—Oblon, Fisher, Spivak, McClelland & Maier

[57] ABSTRACT

A vital digital control system with keyboard inputs for activating at least one output device in response to a manual keyboard selection of a sequence of the predetermined number of operation instructions, including a keyboard encoder for generating a message based on the operation instructions, a vital decoder coupled to the keyboard encoder for identifying each pair of message words and for producing diverse output words and diverse display words based on the message words and diverse display echo words based on the display words, and a display coupled to the decoder for displaying a representation of the display words. The vital decoder includes means for sequentially producing diverse multi-bit checkwords based on predetermined words generated by the system indicative of system performance, these predetermined words including the display words and the display echo words. The checkwords are produced in response to receipt of the message words and may be based additionally on diagnostic testing routines formed before, during, and after receipt of the keyboard instructions. The vital decoder compares each of the generated checkwords to a predetermined constant multi-bit pattern and produces a validation signal if sequential ones of the checkwords are complementary and are identical to the milti-bit pattern, whereupon the vital decoder activates output devices in accordance with the specific keyboard instructions, but only in the event that valid system operation is indicated by means of the presence of the validation signal.

16 Claims, 6 Drawing Figures

KEYBOARD CONTROLLED VITAL DIGITAL COMMUNICATION SYSTEM

This is a continuation of application Ser. No. 007,184 filed Jan. 29, 1979, now abandoned.

CROSS-REFERENCE TO RELATED APPLICATIONS

This application is related to the technology disclosed in my prior U.S. Pat. Nos. 4,090,173 and 3,995,173; and my prior U.S. patent application Ser. No. 873,574 filed Jan. 30, 1978, now U.S. Pat. No. 4,181,949, entitled "Vital Relay Driver Having Controlled Response Time", and U.S. application Ser. No. 002,765 filed Jan. 11, 1979, entitled "Vital Electronic Code Generator"; the disclosure of each of these patents and applications being specifically incorporated by reference herein.

BACKGROUND OF THE INVENTION

1. Field of the Invention:

This invention relates to a vital, i.e. fail-safe, digital control system responsive to the application of sequentially produced keyboard instructions to establish a particular output configuration based on the keyboard instructions, which finds particular, but not exclusive, utility in the environment of a modern rail transit system.

2. Description of the Prior Art:

Modern rail transit systems employ cycle checking and diversity safety design techniques to protect against unsafe conditions. Cycle checking involves the continuous testing of a device, circuit, or computer instruction to ensure that it is completely functional. Diversity, on the other hand, involves the use of two or more independent channels to produce a permissive output, in which the channels are selected so that a single disruptive event cannot cause identical failures in all of the channels, and all channels must agree before permissive output is accepted. These safety design techniques are directed to the promotion of fail-safe, or "vital", operation, in which any failures which occur tend to result in a condition which is no more dangerous (or conversely at least as safe) as if an equipment failure has not occurred.

In my U.S. Pat. No. 4,090,173, cross-referenced above, is disclosed a vital digital communication system wherein the digital logic, whether implemented using hard-wired logic, or microprocessor technology, is checked by vital circuits before an output is allowed, thereby protecting against erroneous operation of the system. To that end, this prior system employs an encoder and a decoder arranged to communicate via a vocabulary of predetermined messages, each formed by a pair of digital complementary words separated by framing bits of a predetermined bit pattern, with the predetermined messages being repetitively generated and applied by the encoder to the decoder.

In one embodiment of my prior vital digital communication system, the decoder employs a microprocessor which is arranged to decode each message and then to sequence through a number of check procedures to determine proper microprocessor operation. These checking procedures include generating a predetermined bit pattern at the output ports of the microprocessor and then delivering this output bit pattern to the microprocessor input ports through a buffer in such a way that the output bit position is shifted to the left one bit upon application to the input ports. The predetermined bit pattern is cycled through the microprocessor until it reaches its initial position, whereupon the presence of the bit pattern and its initial position and the number of cycles required to achieve this condition are used to produce a Port Test word to be used in the checking procedure. The Port Test word is then arithmetically combined with a modified version of the received message word, with the result used to address in a loop-up table stored in memory to obtain a further quantity which is again added to the previous result. This final result, evidenced as a checkword, is a predetermined bit pattern. Since it is not stored in the microprocessor, it can only be generated by correct microprocessor operation, or a highly unlikely sequence or failures. The thusly produced checkword is then applied to external logic to determine the presence thereof, with such determination resulting in the production of a validation signal, which then enables the activation of particular outputs, according to the instruction defined by the input message.

The above previously disclosed communication system is thusly seen to employ repetitive input messaging, with checking procedures in which the microprocessor outputs are continuously manipulated to validate system operation.

However, this prior digital communication system does not specifically address an application where literally hundreds of relays are to be operated by manually entered keyboard instructions. In such a situation, prolonged delays may occur between sucessive keyboard instructions, or between the sequential pressing of keyboard keys in the programming of a particular instruction, so that the system must be capable of reliably verifying valid operation under various operating conditions, including a standby condition in which no keyboard instructions are generated. Additionally, the continuous manipulation of all the microprocessor inputs and/or outputs during the checking procedure can become quite burdensome in an application where literally hundreds of bits of information are continuously being evaluated. In that event, the software and hardware requirements of the system may become prohibitive, not to mention the cycling time delays experienced in processing all the data to verify valid system operation.

SUMMARY OF THE INVENTION

Accordingly, it is the object of this invention to provide a novel vital digital control system which is responsive to manually applied keyboard inputs.

Another object of this invention is to provide a novel vital control system with keyboard inputs, in which cycle checking and diversity are keynote features.

A further object of this invention is to provide a novel digital vital control system with keyboard inputs, in which checking and validation of system performance is continuously achieved, in spite of any stand-by conditions in which keyboard instructions are not forthcoming.

Yet another object of this invention is to provide a novel vital control system under the control of a central processor unit (CPU) having plural output ports, in which validation checking is concentrated on output ports corresponding to particular input messages generated by keyboard instruction.

A further object of this invention is to provide a novel digital vital digital control system employing diagnostic checking procedures to verify a vital system stand-by condition in the absence of keyboard instructions.

A further object of this invention is to provide a novel vital digital control system with keyboard inputs, employing checking procedures which are continuously updated during the sequential generation and application of keyboard instructions.

A further object of this invention is to provide a novel vital digital control system with keyboard inputs, in which keyboard instructions to the system are displayed, and which incorporates a vital test which insures that the instructions displayed correspond to the instructions received from the keyboard.

Another object of this invention is to provide a novel vital digital control system with keyboard inputs, employing a CPU having multiple output ports, wherein multiplexing techniques are applied to selected output ports such that a CPU of reduced capacity can be employed.

Yet another object of this invention is to provide a novel keyboard controlled vital digital control system which will not produce erroneous output in the event of failure, except in a vanishingly small number of unlikely situations.

These and other objects are achieved according to the invention by providing a novel keyboard controlled vital digital control system for activating selected output devices in response to a manual keyboard selection of a sequence of a predetermined number of operation instructions, which includes a keyboard encoder for generating operation instructions. A vital decoder is coupled to the keyboard encoder and decodes the keyboard instructions to produce diverse input message and copy words, output words, diverse display words based on the input words, and diverse display echo words based on the display words. The display words are coupled to a display for verification by the operator that the display words in fact correspond to the programmed operation instructions. While the operator verifies his manual selection, the vital decoder sequentially produces diverse multi-bit checkwords based on predetermined words generated by the system. These predetermined words are indicative of system performance, and include at least message and copy words, the display words, and the display echo words. The decoder then checks that successive of the checkwords are diverse, and compares each generated checkword to a predetermined constant mutli-bit pattern to produce a validation signal if the checkwords are diverse and correspond to a predetermined constant multi-bit pattern. Then, if the vital decoder verifies proper system performance and generates a validation signal based thereon, the output devices corresponding to the manually programmed operation instructions are activated, but only in the presence of the validation signal.

The vital decoder of the invention is implemented using a central processing unit (CPU) having an input port to which the keyboard messages are applied, plural address output ports for selecting particular output devices to be operated, and plural command output ports for identifying a particular operation to be performed by the selected output devices. The CPU produces at least one address output word and at least one command output word corresponding to the keyboard operation instructions, and routes these words to respective selected address and command output ports. Similarly, the CPU is provided with a display output port coupled to the display, by which display output words generated by the CPU are displayed.

The CPU is provided with a display echo input port, and plural address and command echo input ports, the number of which corresponds to the address and command output ports. The display output port, the address ports, and the command output ports are connected to the respective echo input port by isolation circuits which couple each output bit of each output port to an input bit of an echo input port with a left shift. The isolation circuits are used during diagnostic port tests, as discussed in my prior patent, and additionally facilitate the return to the CPU of modified output words for checking purposes, hereinafter discussed.

The diverse multi-bit checkwords produced by the vital decoder, in addition to the words mentioned above, may also be based on predetermined arithmetic combinations of diverse address and command input words from the keyboard, diagnostic port test words, output port signature words, and system status words.

In order to produce the requisite diverse checkwords, the vital decoder, or more exactly a CPU, is provided with an addressable memory in which is stored a plurality of normalization, or DELTA, words each of which corresponds to a particular address of the memory. In formulating the checkwords, this memory is addressed by a predetermined one of the predetermined words on which the checkwords are based, in order to read from the memory a particular normalization word to be combined arithmetically with the other predetermined system performance words to assure that checkwords of only the constant multi-bit pattern are generated in the event of valid system operation.

The CPU address and command output ports are organized in groups, with each port of each group including plural bits, with each bit connected to a dedicated vital relay. During operation, only selected groups of output ports, corresponding to the keyboard instruction, are enabled, with the digital level of the individual bits associated with the selected groups determining the activation of the associated vital relays, but only in the presence of the validation signal produced by the vital decoder.

The system of the invention further envisions the use of output multiplexing circuits at selected CPU address and command ports, and selected bits of each port implemented by means of relays connected to the selected address and command bits, one relay per bit, of selected multiplexed output ports. The multiplexing relays having plural contacts, each connected at one side thereof to a first signal, such as a return signal, and respectively connected at the other side thereof to an associated address or command vital relay which is operable only in the event that the particular CPU output port has been selected, and only if the validation signal is produced. Each multiplexing relay can optionally be provided with a checking contact, connected in series with the checking contacts of the other multiplexing relays, to produce a multiplexing relay back check signal to be used in the production of the checkwords by the CPU. The provision of the checking contacts allows the use of non-vital relays.

The vital decoder produces output port signature words, to be used in production of the checkwords, by submitting the contents of the ports, identities plus outputs, to a cyclic redundancy check in which a serial stream of the port bits is divided by a selected polynomial. The remainder from this division is a signature unique to the port contents and is used at the output port signature. Similarly, during system idling, i.e. in the absence of keyboard instruction, or during the time between keyboard instructions, the system produces a diagnostic signature based on the contents of memory which may include the normalization table, decoding table, instructions, and read/write memory to likewise produce diagnostic signature words used in the production of the system checkwords.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DETAILED DESCRIPTION OF THE PREFERRED EMBODIMENTS

Figure 1:
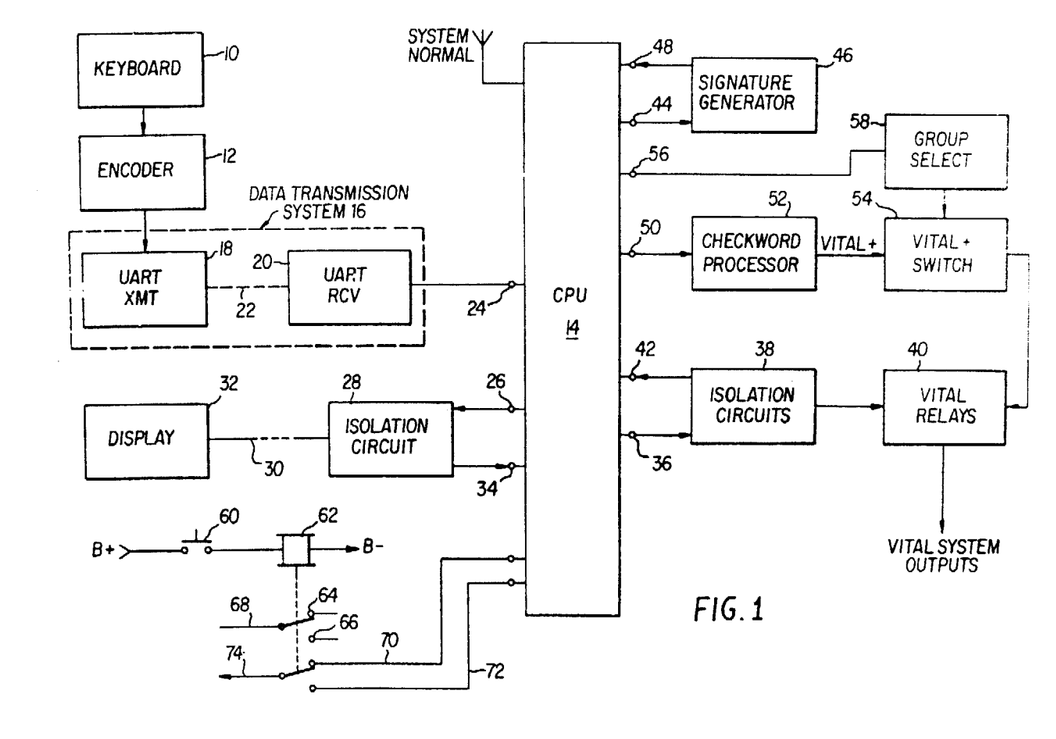
FIG. 1 is an overview block diagram of the vital digital control system with keyboard inputs, of the invention.

Referring now to the drawings, wherein like reference numerals designate identical or corresponding parts throughout the several views, and more particularly to FIG. 1 thereof, the keyboard controlled vital digital control system of the invention is seen to include a keyboard 10 and encoder 12 coupled to the keyboard 10, a central processing unit (CPU) 14, and optionally a data transmission system 16 connecting the encoder 12 with the CPU 14. The data transmission system 16, which is only required if the encoder 12 is located a considerable distance from the CPU 14, includes a UART transmitter 16 connected to a UART receiver 20 by means of a 2-wire transmission line 22. The output of the UART receiver 20 is connected to a message input port 24 of the CPU 14.

Input instructions are manually keyed into the keyboard 10, and encoded by the encoder, e.g. by means of a 3 out of 8 code. Each encoded keyboard instruction in turn includes diverse forms of input message, which may be a message word, and a copy word which is the complement of the message word, in which the ones and zeroes of the copy word are reversed in comparison to that of the message word. On the other hand, the keyboard instruction may be translated into other diverse message formats which are well-known to practitioners in the art. In any event, the keyboard instructions delivered to the CPU 14 are decoded by the CPU into two diverse forms as message input words and copy input words, and are stored in a memory within the CPU.

The keyboard instruction delivered to the CPU 14 is translated into a display format likewise stored in memory within the CPU 14. The contents of this display store are transfered via a display output port 26 to an isolation circuit 28 through multi-wired cables 30 to a conventional display 32. Additionally, the CPU 14 is provided with a display echo input port 34 connected to the isolation circuit 28 by which display words produced by the CPU 14 in response to the keyboard instructions are returned to the CPU for vital, or fail-safe, system processing. Thus, the CPU output port isolator circuit/CPU echo input port organization represents a vital port configuration for ascertaining valid system operation.

As further shown in FIG. 1, the CPU 14 includes at least one output port 36 coupled via isolation circuits 38 and vital relays 40. As with the display isolation circuits 28, the output circuits 38 feed the CPU output at output ports 36 back to the CPU 14 by means of an output echo input port 42. Keyboard instructions stored in the form of message and copy words are translated by the CPU 14 into output words routed to the output port 36 for control of the vital relays 40. Each of the relays 40 has a number of contacts, the operation of which results in vital system outputs corresponding to the keyboard instructions.

As further shown in FIG. 1, the CPU 14 is provided with an additional output 44 connected to a signal generator 46 which produces signature words indicative of system status and/or system performance and returns these signature words to the CPU 14 by means of input port 48.

As discussed in more detail hereinafter, the CPU 14 produces diverse checkwords indicative of valid system performance. These checkwords appear at output port 50 and are applied to checkword processor 52. The processor 52 verifies the diversity of sequentially generated CPU checkwords, and the fact that the checkwords correspond to a constant multi-bit pattern, and produces at least one Vital+signal in the event of valid system performance, and delivers this Vital+signal to at least one Vital+switch 54.

Figure 3:
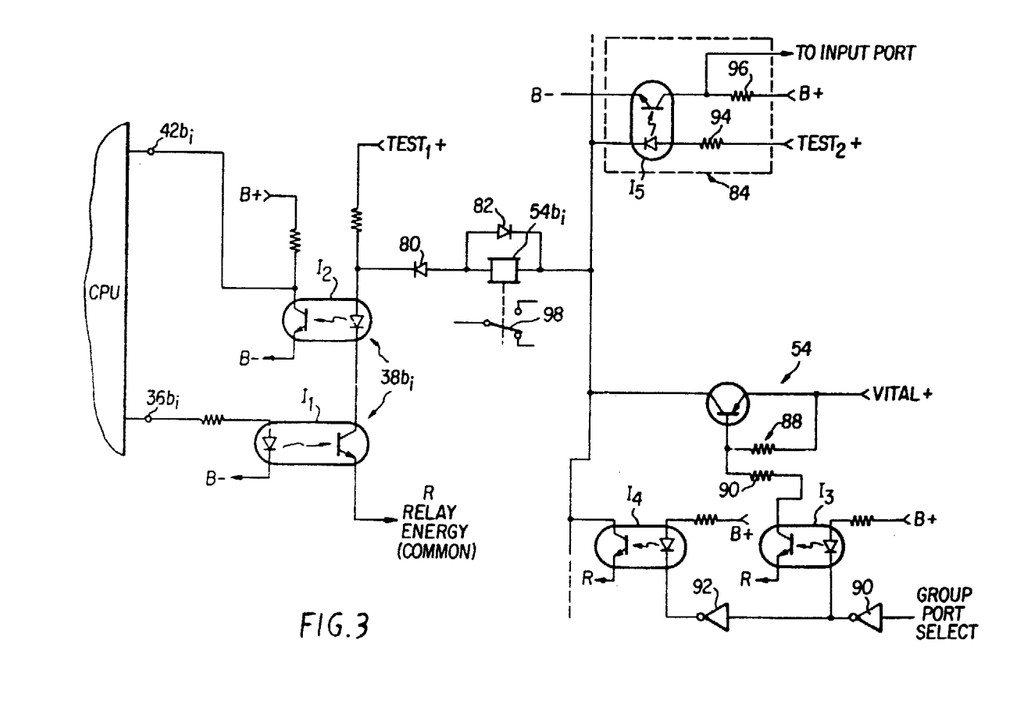
FIG. 3 is a circuit diagram illustrating in more detail the interrelation between the isolation circuits, the vital relays, and the Vital+ switches, shown in FIG. 2.
Figure 4:
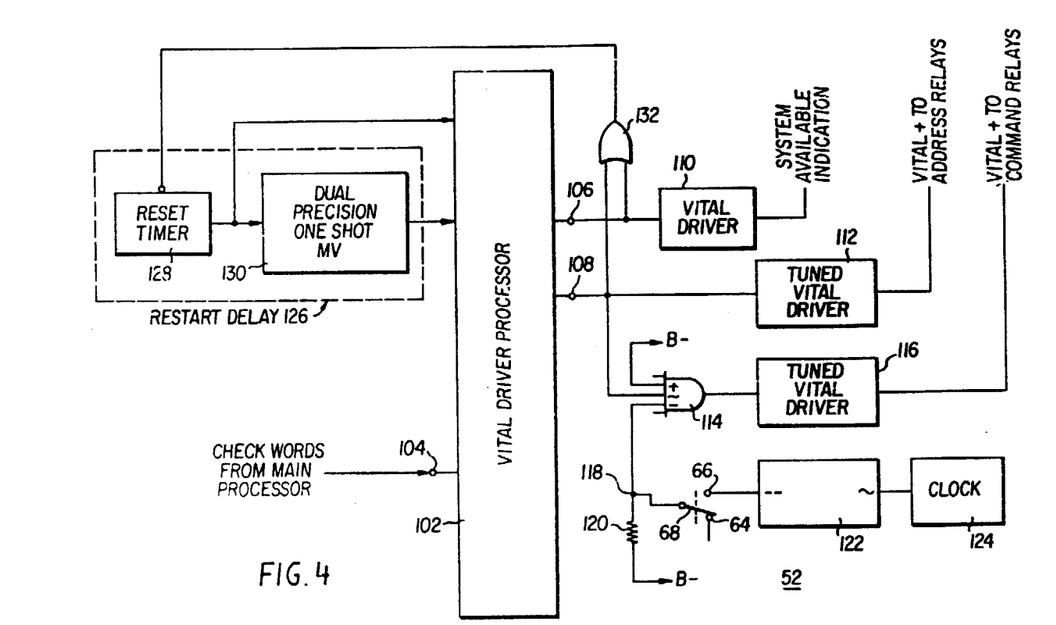
FIG. 4 is a block diagram illustrating further details of the vital decoder of the invention.

The system of the invention is designed to accomodate literally hundreds of vital relays 44, as shown in more detail in FIGS. 3 and 4. FIG. 1, however, schematically illustrates a CPU output port 56 connected to a group selector 58 which enable a particular group of vital switches 54 corresponding to particular output ports 36. Thus, in the event of system validation by the checkword processor 52, and selection by the group selector 58, Vital+ is delivered from the checkword processor 52 through the Vital+switch to the vital relays of selected output ports, with only those relays associated with selected bits of each selected port being energized to produce vital system outputs.

After an operator has manually keyed in his keyboard instructions, and has visually verified by means of the display 32 that the instructions displayed correspond to the intended operation, the operator is provided with an execute push button 60 connected between system B', a vital relay 62, and system B—. Associated with the relay 62 is a first pair of contacts 64 and 66 with an associated wiper 68, and a second pair of contacts 70 and 72 with an associated wiper 74. The first switch represented by elements 64, 66 and 68 is used in the application of a Vital+ signal to the command vital relays, as shown in FIG. 4 and is discussed in more detail hereinafter, while the second switch represented by the elements 70, 72, 74 is connected to input ports 76, 78 to signal the CPU 14 that the operator agrees with the displayed instructions, whereupon the CPU 14 updates the checkwords produced at the checkword port 50 such that these checkwords are additionally based on the execute signal produced by the execute switch 60.

Figure 2:
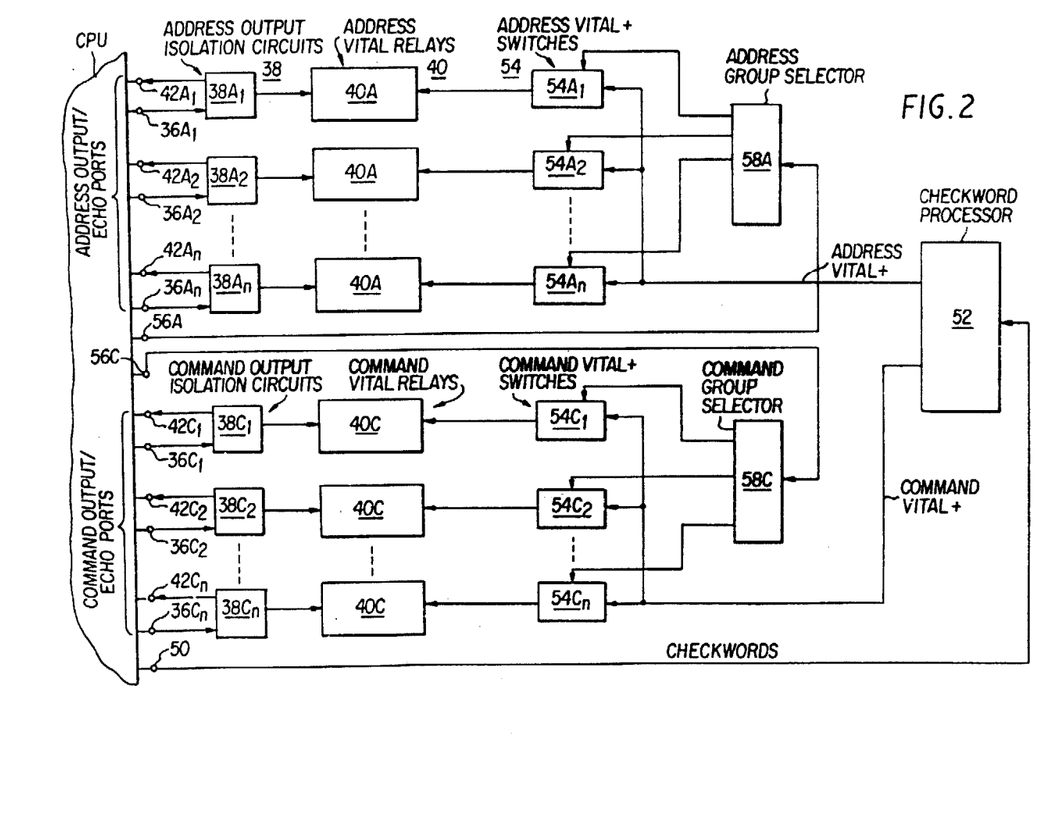
FIG. 2 is a schematic block diagram illustrating in more detail the address and command output organization of the vital digital control system of the invention.

As shown in more detail in FIG. 2, the CPU output ports 36 and output echo input ports 42 are organized in terms of address output ports 36A, address output echo input ports 42A, command output ports 36C, and command output echo input ports 42C. The address and command output words produced by the CPU are delivered through respective isolation circuits 38A and 38C to respective address and command vital relays 40A and 40C, the isolation circuits 38A, 38C returning respective address and command output echo words to the output echo input ports 42A, 42C.

Also, the system of the invention includes address group selectors 58A and command group selectors 58C which respectively enable address Vital+ switches 54A and command Vital+ switches 54C. Thus, the CPU 14 by means of select words produced at output ports 56A and 56C, and in corresporndance to the keyboard instructions, controls the group selectors 58A, 58C to enable specific Vital+ switches 54A, 54C corresponding to specific address and command output ports 36A, 36C so that only the address and command vital relays associated with the selected output ports can possibly receive address or command Vital+signals produced by the checkword processor 52 and delivered through the respective Vital+switches 54.

FIG. 3 shows in more detail a single stage of the vital output port configuration shown in FIGS. 1 and 2. More specifically, it is noted that each output port 36 includes plural individual bits $36b_i$, usually 8 or 16 of such bits, each of which is connected to a dedicated optical isolation circuit $38b_i$. Each optical isolator in turn includes a pair of isolators $I_1$ and $I_2$, each of which includes a light emitting diode optically coupled to an associated light sensitive transistor. Thus, as shown in FIG. 3, a low, or "zero", digital level at a particular output port bit results in current conduction through the diode of isolator $I_1$, which then emits light which is sensed by its associated transistor. The transistor of isolator $I_1$ is then switched to a saturated conducting state such that the light emitting diode of isolator $I_2$ conducts current and emits light to its associated transistor which in turn is switched to a saturated current conducting state. The collector of the transistor of isolator $I_2$ is in turn connected to the CPU output echo input port $42b_i$ whereby an output at an output port $36b_i$ is coupled through the isolator circuits $I_1$ and $I_2$ back into an associated echo input port bit $42b_i$.

Connected to the anode of the diode of isolator $I_2$ is the cathode of a blocking diode 80, the anode of which is connected to one side of the activation coil of a vital relay $54b_i$. Connected in parallel to the relay coil is a suppression diode 82, the anode of which is connected to the anode of diode 80. Connected to the cathode of the diode 82 and the other side of the vital relay $54b_i$ is a Vital+ switch 54 and a test circuit 84.

Also connected to the anode of the diode of isolator $I_2$ is a resistor 86 which is connected to a TEST$_1$+ signal which is generated by the CPU 14 during diagnostic testing, discussing hereinafter in more detail.

The Vital+switch shown in FIG. 3 is seen to include a PNP switching transistor 86 having applied to the emitter thereof the Vital+ signal, which is generated by the checkword processor 52 as shown in FIG. 4. Associated with the transistor 86 are resistors 88 and 90, with resistor 88 connected between the emitter and base of transistor 86 and resistor 90 connected at one side thereof to the base of transistor 86. The other side of resistor 90 is connected to an isolator circuit $I_3$, and more particularly the collector of the light sensitive transistor of isolator $I_3$. The anode of the light emitting diode of isolator $I_3$ is connected through a resistor to system B+, while the cathode of this diode is connected at the junction 88 to the output of gate 90 and the input of gate 92. The input to gate 90 in turn is connected to a group port select signal from an associated group port selector 58, and the output of gate 92 is connected to the cathode of a light emitting diode associated with another optical isolating circuit, $I_4$. The cathode of the diode of isolator circuit $I_4$ is connected through a resistor to B+. The light sensitive transistor of isolator $I_4$ on the other hand in connected to the collector of transistor 86 and to all the other vital relays $54b_i$ associated with the particular output port. The emitter of the transistor of isolator $I_4$ is connected to a relay energy common bus R, as is the emitter of the light sensitive transistor of isolator $I_1$.

The test circuit 84 shown in FIG. 3 is seen to include an optical isolator circuit $I_5$, the diode of which has its anode connected through a resistor 94 to a TEST$_2$+ signal generated by the CPU 14. The cathode of the diode of isolator $I_5$ is connected to the collector of transistor 86, the vital relays $54b_i$ associated with the particular output port, and the collector of the transistor of isolator $I_4$. The light sensitive transistor of isolator $I_5$ has an emitter coupled to the processor energy common bus, and a collector coupled through a resistor 96 to B+, which collector is further connected to a group echo input port (not shown) of the CPU 14.

During operation, and assuming that the group port select signal applied to gate 90 is high or, a ditigal "one", then a Vital+ signal is coupled through the transistor 86 to the vital relay $54b_i$. If a digital "zero" is generated by the CPU 14 at the particular output port bit $36b_i$ associated with the relay $54b_i$, then this data is coupled through the isolators $I_1$ and $I_2$, through the diode 80, to the other side of the vital relay $54b_i$. This results in a Vital+ voltage being impressed across the relay $54b_i$, causing energization of the relay coil and switching of the associated relay contacts 98.

Diagnostic testing of the circuits shown in FIG. 1 is achieved by means of TEST$_1$+ and TEST$_2$+ signals generated by the CPU 14. Firstly, the TEST$_1$+ signal is applied with a logic "one" level with the TEST$_2$+ signal having a logic "zero" level, thereby assuring that the vital relay $54b_i$ remains unenergized. A fault in the isolator circuit $I_1$ or $I_2$ will then be detected when fed to the CPU output echo input port $42b_i$, at which point the CPU 14 takes appropriate action to halt operation and indicate the existence of a fault. If this first test indicates that no fault exists, then the TEST$_2$+ signal is raised to a logic "one". If current then is conducted through the diode of isolator $I_5$, indicating a fault, then this information is coupled to the input port via the transistor of isolator $I_5$. Optionally, the collectors of the transistors of isolators $I_2$ and $I_5$ which are the inputs to the main and group echo ports, may be interconnected with a single input being directed to the CPU echo input port $42b_i$.

The vital port configuration discussed above with respect to the output port 36, isolation circuit 38, and input port 42, likewise applies to the interconnection between the display output port 26, the display isolation circuit 28, and the display echo input port 34, which is likewise vitally implemented. This vital port configuration is specifically utilized by the system according to the invention to check the CPU I/O to see that it is actually under control of the CPU 14. To effect this check, the output of each output port is wired to the associated echo input through the respective isolator circuits with a predetermined shift, such as a right shift or a left shift, e.g. with output port bit one wired to input port bit 2, output port bit 2 wired to input bit 3, etc. The CPU enables a port check, by loading a bit into the first bit position of an output port, for example, and then reading this bit at the associated echo input port. The echo input is then transferred to the output port and the operation repeated until the loaded bit is cycled through the output ports. The CPU, therefore, loops through the input reading and transfers the input to the output and determines how many cycles it takes for the bit to travel back to the initial position. The CPU 14 then stores in memory a Port Test word corresponding to the count obtained in the Port Test.

In the absence of keyboard instructions, and between keyboard instructions, the vital system of the invention performs various diagnostic routines to verify system performance. Previously discussed above were the Port Test routine, which is applicable to each of the vital ports (output/echo input), and the output testing routine involving the $TEST_1+$ and $TEST_2+$ signals, which are tests enabling signals for these ports. Since the system according to the present invention employs a normalization table stored in a memory in the CPU 14 to generate checkwords, as discussed in more detail hereinafter, the present system forms a diagnostic routine using cyclic redundancy checks to verify the contents of the normalization table. These cyclic redundancy checks, which are discussed in more detail by Schweber et al., "Softward Signature Analysis Identifies and Checks PROMs", EDN, Nov. 5, 1978, pages 79-81, convert the diagnostic test inputs into a serial stream of bits which are applied by the CPU 14 at output 44 to the signature generator 46. The signature generator 46 divides the serial data stream by a predetermined polynomial, and the remainder from this division is a signature unique to the table contents. This unique signature remainder, in the form of a diagnostic signature word, is then returned to the CPU 14 by means of input port 48 where it is utilized along with the other diagnostic words in the formation of appropriate checkwords.

As shown in FIG. 1, the signature generator 46 is external to the processor. Naturally, the diagnostic signature can be generated by means of CPU software, but the generation thereof may then take too long, and may unduly burden the CPU 14. The signature generator 46 may conveniently be implemented external to the CPU 14 using a UART and a CRC generator, such as a Fairchield 9401.

As noted above, the vital system according to the present invention generates diverse checkwords based on a number of vital system checks to verify that the CPU 14 and its vital interfaces are working properly. These diverse checkwords, disclosed herein for convenience sake as being complementary, are validated external to the CPU by the checkword processor 52, shown in more detail in FIG. 4, to produce Vital+ signals to energize the selected vital relay when the operator presses the execution button. The diverse checkwords are formed by arithmetically combining predetermined words indicative of system performance, as generated by the CPU, in predetermined combinations. Each checkword pair comprises a direct checkword and its complement and corresponds to a predetermined constant, or normalized, multi-bit pattern.

Normalization of the checkwords is achieved by means of the normalization table, discussed above, stored in the CPU. Since each keyboard instruction effects a unique CPU I/O configuration, a normalized checkword is achieved by addressing the normalization table by means of a preselected system word produced by the keyboard instruction, fetching a corresponding normalization word or DELTA word, from the normalization table, and additionally basing the checkwords on the DELTA word. Naturally, the DELTA word stored in the normalization table are selected so that when combined with the other predetermined system words, the same multi-bit checkword pattern is formed.

In formulating the checkwords, the CPU 14 in conjunction with the signature generator 46 additionally produces a port signature word indicative of the contents of the data routed to the address and command output ports to a cyclic redundancy check in which a serial stream of the respective port bits is divided by a selected polynomial, in a fashion similar to that as discussed above with respect to the diagnostic signature test. Once again, the remainder from this division is a port signature word unique to the port contents. In order to guard against the unlikely event that two sets of contents produce the same port signature, the signature analysis performed during a complement checkword analysis cycle utilizes a different divisor polynomial in order to assure that different port signatures will be obtained during the direct checkword cycle and the complement checkword cycle.

To further enhance the vitality of the cyclic redundancy port signature check, each of the address and command output ports 36 include at least one identity bit, a different bit for each port, which is included in the serial data streams supplied to the signature generator 46. However, the identity bits in each of the respective ports are used only in the generation of the port signature words. Thus, in formation of the port signature word, the CPU is expecting specific and different output configurations at the various output ports, as produced by the identity bits, such that even unselected ports present a specific identity/output configuration to be applied to the signature generator 46. In effect, the provision of identity bits in the various output ports reflects the wariness of using a logic "zero" as a fault indication to a vital system, wherein the absence of logic "zeroes" in the unselected ports, which often can be in the majority, would otherwise indicate valid operation. Thus, by providing each output port with an identity bit, it is assured that each output port including unselected output ports will present a relatively unique contribution to the port signature word.

As noted above, the CPU 14 sequentially produces checkword pairs, each including a direct word and a complement word. In one embodiment, the direct checkword contains at least the sum of the stored message word, the result of an output port test, and a DELTA word obtained by using the output port signature as an address to the normalization table. In this embodiment, the check complement word contains at least the sum of the display echo word stored in the CPU, a display port test word, and an echo DELTA word obtained by addressing the normalization table with a diverse port signature word in which a different polynomial divisor is used.

As noted above, the keyboard instructions to the CPU 14 are sequentially entered as address instructions to select a device to be controlled, and more particularly the vital relays associated therewith, to be followed by command instructions to select what is to be done on the device addressed, by means of the command vital relays. Thus, CPU stores the following entities divided into two groups as follows:

Address Message word
Address Copy word
Address Display Echo word
Command Message word
Command Copy word
Command Display Echo word After the address has been entered, only the first three of the above words are present. The CPU then generates a checkword to validate the address selection.

In a preferred embodiment, the state of the execute switch 60 as evidenced by the switch element 70, 72 and 74 is also used in the formation of the checkwords. Therefore, at this time, before a command has been entered, the execute button has not been pushed, so that a component to the address checkword is EX.

In a preferred embodiment, the checkword generated by the CPU 14 should include all the items of concern, so that the results of the diagnostic (memory signature) performed when the system was idle are saved and used. Also, in a preferred embodiment in which the system of the invention is used in conjunction with a railroad vital relay system, a signal from the railroad vital relay system indicating that it is ready to be controlled is included in the formation of a checkword. This signal, called System Normal, is applied to input port 100, as shown in FIG. 1.

In a preferred embodiment, the diverse checkwords generated by the CPU are based on the following arithmetic combinations:

Address Check =
 Stored Diagnostic Signature and Address Port Test words
 +Address Message word
 +Address Output Port Signature word
 +System Normal+EX words
 +DELTA (accessed by the Address Display Echo word)
Address Check =
 Stored Diagnostic Signature + Address Display Port Test words
 +Address Copy word
 +Diverse Address Port Signature (different polynomial) word
 +System Normal+EX words
 +DELTA (accessed by the Address Copy word)
Execute Check =
 Address Check
 +Command Message word
 +Command Output Port Test word
 +Command Port Signature word
 +System Normal+EX words
 +DELTA (accessed by the Command Display Echo word)
Execute Check =
 Address Check
 +Command Copy word
 +Command Display Port Test word +Diverse Command Port Signature word
 +System Normal+EX word
 +DELTA (accessed by the Command Copy word)

The checkwords thusly derived in the preferred embodiment exemplify the formation of the checkwords. However, endless variations are possible. For example, where the same quantities are used in more than one place, for example, System Normal or EX, one of these values may be altered before the second usage by the CPU, by shifting or by arithmetic modification, to further emphasize the diversity of the checking process.

The checkword, and the checkword complement produced by the CPU are delivered to the checkword processor, shown in block diagram form in FIG. 4, as they are generated. These checking words cannot exist simultaneously in a CPU, because they share a common single memory location for their generation prior to being transferred to the checkword processor.

The checkword processor in FIG. 4 evaluates the sequentially delivered checkword and checkword complement to verify valid system performance, and to provide a Vital+ signal for activation of the relays selected by the keyboard instructions. Thus, the checkword processor compares sequentially generated checkword/complement words against the predetermined multi-bit patterns to produce the Vital+ relay drive signals. Since neither the checkword nor the checkword complement is stored anywhere in the CPU, it can only be generated by correct operation of the hardware and the software in the system.

As shown in FIG. 4, the checkword processor is implemented by means of a vital driver processor formed by a conventional microprocessor such as the RCA 1802, to perform the two most important tasks of the vital driver function:

1. Vital+ must be generated only when the proper check-word and its complement are delivered;

2. The Vital+ must be generated for an exactly defined time, which is selected to be less than the operating time of any vital output relay so that any system failure causing an invalid checkword will be detected in time to prevent relay operation.

Since the system according to this invention is responsive to address and command keyboard instructions, the system provides for two stages of validation, address and command.

The checkword processor 52 shown in FIG. 4 is seen to include a vital driver processor 102 having an input port 104 to which is applied the checkwords from the CPU 14. The vital driver processor 102, a microprocessor, has output ports 106 and 108 at which ports are respectively delivered validity signals, in the form of constant frequency digital pulse trains, in the event of valid system operation. The validity signal from port 106 is applied to a tuned vital driver 110 which generates a system available indication. The validity signal appearing at the port 108 is delivered to the tuned vital driver 112 and the Dynalevel gate 114. The "+" input of the gate 114 is connected to B−, while the "−" input of the gate 114 is connected at the junction 118 to a pull up resistor 120 and the wiper 68 of switch 64, 66, 68 associated with the execute button 60. The contact 66 of the switch is connected to a vital driver 122 which in turn is connected to a clock 124. The vital driver 122 produces a potential which can be termed "super−", i.e. more negative than any supply potential found in the system. This "super−" potential is applied through the contact 66 and the wiper 68 through the "−" input of the gate 114 upon operator pressing of the execute button. Thus, the two stage of system above, address and command, are implemented firstly by the tuned vital driver 112 to produce a Vital+ signal to the address relays, and secondly by means of the Dynalevel gate 114 and tuned vital driver 116 which provides a Vital+ signal to the command realys after pressing of the execute button. Obviously, it may be desirable for route control to validate in more than two stages. However, the principles and hardware described can be expanded to provide as many stages as are desired. Detailed descriptions of the circuit elements 110, 112, 114, 116, and 122 are found in my prior U.S. Pat. No. 4,090,173, cross-referenced above.

The checkword processor shown in FIG. 4 also includes a restart delay circuit 126 formed by a reset timer 128 and dual percision one-shot multi-vibrator. The restart delay circuit 126, discussed in considerable detail in my related cross-referenced patent application Ser. No. 002,765 filed Jan. 11, 1979 is used in the diversity check on a software delay used in a vital driver processor start routine. This delay, vitally enforced by diversity, prevents the checkword processor from recovering from a failure quickly enough to produce a burst of Vital+ which could otherwise pick up an output relay.

Figure 5:
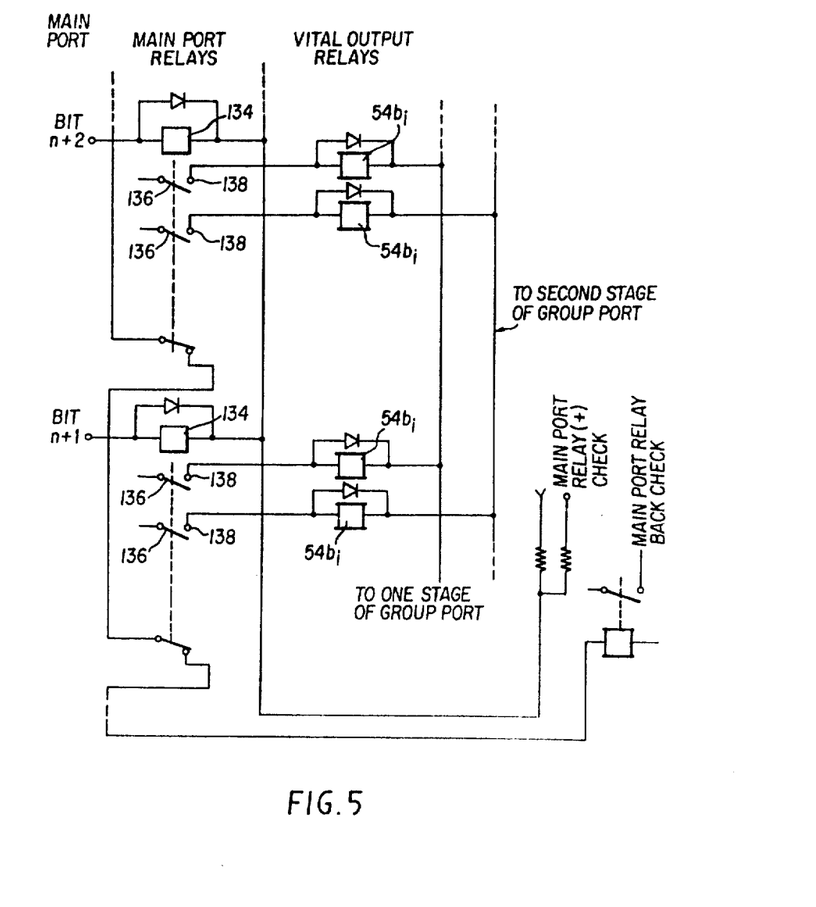
FIG. 5 is a block diagram illustrating output port multiplexing techniques according to the invention; and, FIG. 6 is a circuit diagram of an alternative embodiment of the isolation circuits shown in FIG. 3.

In order to minimize the capacity requirements of the CPU 14, which is ideally implemented by means of microprocessor, FIG. 5 illustrates an output multiplex circuit for reducing the required number of CPU output ports. Basically, this multiplex circuit employs plural main port relays 134, connected to each of the bits of an output port from the CPU. Each of the main port relays 134 has plural switching elements 136 and 138 connected in series between a vital output relay 40 and a relay common returns, R. Thus, it is seen that the multiplex system of FIG. 5 trades off the cost of one relay per bit on a CPU output port to reduce the number of output port bits required by a number equal to the number of main port relay switches connected to vital output relays.

The main port relays 134 in the multiplex circuit of the invention each include a back switch contact, which is connected in series with a back switch contact of the other main port relays, to produce a main port relay back check signal to test whether or not any of the main port relays are latched in a particular state. This main port relay back check signal may optionally be included in the formation of the checkword and permits the use of non-vital main port relays 134.

Figure 6:
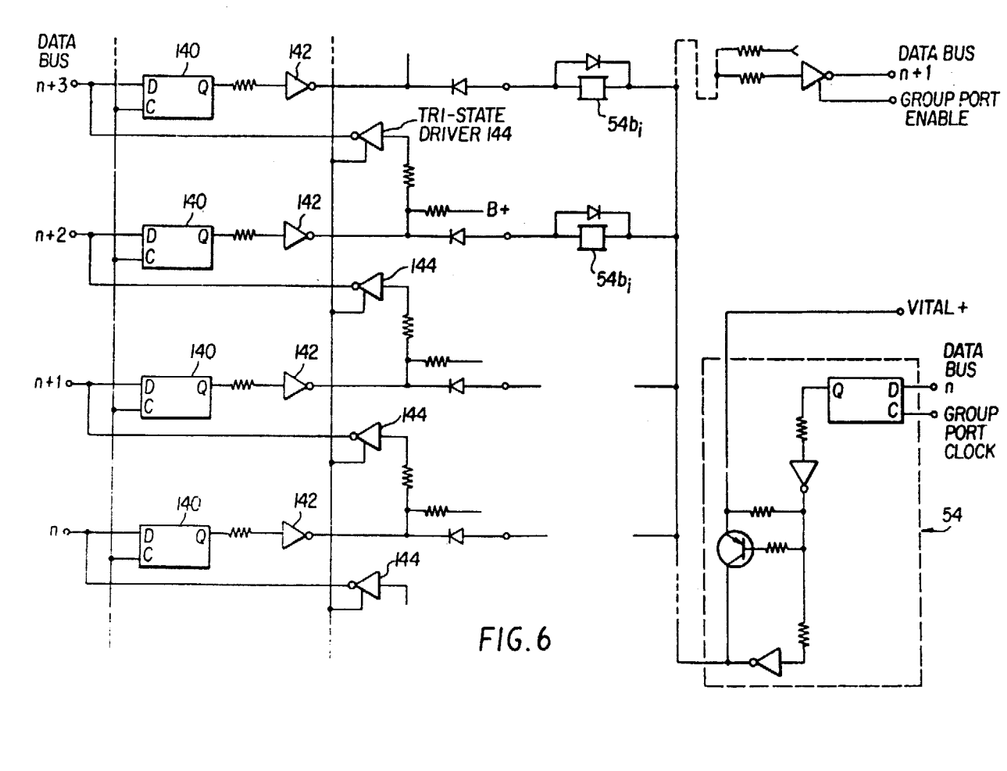

FIG. 6 illustrates an alternative embodiment to the optical isolation circuits used to feed a CPU output port signal back into an associated echo input port. In this embodiment, each output port bit is connected to a standard type D flip-flop 140 followed by an open collector relay driver 142. Each output stage is accompanied by an input stage comprising a tri-state invertor 144. As shown in FIG. 6 the input stage is connected so as to shift the outputs one bit as they are delivered to the data bus, to facilitate the port test discussed above. Also, as shown in FIG. 6, the Vital+ switch 54 for enabling the application of Vital + to the vital relays 40 is shown implemented by means of conventional digital logic.

To recapitulate, the vital digital control system of the present invention allows the use of a readily available keyboard (such as the type used for calculators) as an input to a vital system. The keyboard itself does not need to have vital characteristics. However, the validity of the keyboard input is nevertheless verified by the operator after the keyboard instruction is displayed by the system. Thus, an important feature of this system of this invention is a vital test which insures that information displayed is the information received from the keyboard. A second important feature is the vital test to insure that the output devices respond correctly to the logic system, while a third important feature insures that the output is the correct output for a given input.

The vital system of the invention is implemented by means of a digital decoder, in the form of a central CPU, a microprocessor, and associated checkword processing circuits.

When the system is not in use, it performs diagnostic routines to prove that it is available when needed. These diagnostic routines include signature analysis of memory contents, and tests of the display output ports, and vital drivers.

When a keyboard entry is made, the specific instruction is placed in the message store, preferably in a constant ratio code such as 3:8, or 2:5. This message store in the CPU is not again written into for the duration of the transaction. However, this number is translated into display format and similarly placed in a display store in the memory of the CPU. The contents of the display store are transferred to the display after the display port has been tested. The output port test verifies that the states of the output devices can be tested. Broken connections or open or shorted input devices cannot cause an improperly working output device to go undetected.

The information routed to the display output port is transferred into an echo store in the CPU in a format different from the format used in the message or display stores. The contents of the message and echo stores are diverse forms of the keyboard input instructions and are used by the processor to control the selected output vitally.

The operator must confirm that the display reflects the intended operations or he must not initiate the execute command. Any apparent error could be the result of a system failure or an operator error. If the desired operation is not displayed, the operator pushes a cancel button, which for example may remove power from the processor, clearing its memories of useful data and forcing it to reset.

The system performs diagnostic checks before, between, and after keyboard depressions. When a complete message has been keyed in by the operator and displayed, the processor performs a port test on various output ports, the results of which are stored for use in generating checkwords. The address and command output ports are arranged in specific groups which are selected by the CPU in response to the keyboard instructions such that it is necessary to perform a port test only on the specific ports used so as to save the time that it would otherwise require to test all the CPU ports.

The vital control system of the invention employs the checkword/checkword complement combination as a convenient vehicle for vitally enforcing the performance of the CPU. The vital output relays are not energized unless many tasks have been performed correctly, as evidenced by a correspondence among the various inputs to the formation of the checkword. The checkword and its complement are generated from selected diverse components, including all vital factors. Of crucial importance is the fact that the processing circuits do not have the checkword in a memory, but can only produce it in the event of valid operation by performing each of numerous tasks correctly.

An example of a typical flow chart for producing the checkword pair is presented in the table. It is noted, however, that the system of the invention includes further software checks (non-vital) at every state of system operation to alert the operator of errors.

Various modifications and variations of the present invention are possible in light of the above teachings. One such modification has already been discussed with respect to the isolation circuits shown in FIGS. 3 and 6. While the circuit of FIG. 3 employs optical isolator circuits to return output to input, the circuit of FIG. 6 instead employs large film type resistors to limit energy that might be introduced into the relays by a failure inside a latch or buffer. Thus, in either case, if Vital+ is witheld for any reason, it is impossible to pick up a vital relay by application of Vital+ signal from any other source.

Another area where many modifications can be made involve the testable display. As described above, the display testing techniques return the display output signal to a display input echo port for diversity checking, assuming that the lines from the output ports to the actual display are themselves vital. However, in another design approach, the display echo input signals can be formed by means of a light sensor associated with each of the display segments of the display character, such that the actual display indications are themselves returned to the CPU. If the display is implemented with individual rectangular lamps, such as Hewlett Packard 5082-4670, a phototransistor can be attached to the side of each segment. On the other hand, an incandescent lamp display can be patterned similarly to Master Specialties 96182, which use optical fibers to couple display signals to the display lamps. Here, a second set of fibers can be used to carry part of the light to the photosensors of an echo return.

A standard display unit could be used with the input of an optically coupled isolator placed in series with each display segment to test for current flow. To guard againt shorted segments giving false indication, the voltage across each segment would also have to be sensed and the signals from the voltage and current sensors would then have to be combined in a vital AND function.

The preferred display, discussed above, made from individual character elements which cannot short each other is used with the port test to prove that the states of the display drive can be tested. This type of display only proves that the drive to the display is correct.

On the other hand, and depending upon cost and complexity considerations, a display using light sensors is optimally preferred because it requires no operator effort to prove that it is working and it checks the actual function of converting electrical signals to light.

The requirement to check the display devices themselves might be avoided by using an alphabetical display in expressing the numbers as words, ONE, TWO, THREE, etc . . . . Device failures then cannot easily change one number into another.

Numerous modifications and variations exist in the selection of the checkword, and in the checkword processing. More specifically, the various crucial components to the checkwords can be combined in various diverse combinations while nevertheless remaining within the scope of the invention.

With regard to the checkword processing, it is noted that the present system produces the Vital+ signal only long enough for the vital checks to be repeated within a check cycle, and continuous successful repetition of the vital checks is required to sustain the Vital+. Optionally, vital counting logic can be employed to count the number of check cycles and to generate a time limit in which the operator is required to complete his transaction, before field conditions can change making it no longer safe for him to do so. Failure to complete the transaction within the designated time would then result in a resetting of the CPU as a requirement that new keyboard instructions be entered. If the operator presses the execute button, a new time limit would be established, this new time limit being the duration of energization of the selected output relay.

Obviously, numerous additoinal modifications and variations of the present invention are possible. It is therefore to be understood that within the scope of the appended claims, the invention may be practiced otherwise than as specifically described herein.

FLOW CHART TABLE

KEYBOARD SELECTION OF RELAY
DIAGNOSTIC
|
LOOP

|
    NOT WORKING ? - NO OUTPUT
    |
    INPUT ? - << EXIT
    |
    CONTINUE
    |
END LOOP
|
TRANSFER KEYBOARD ENTRY INTO MEMORY
|
TEST DISPLAY
|
DISPLAY ENTRY
|
TEST PORTS
|
DECODE MESSAGE, SET OUTPUTS
|
INITIALIZE TIME LIMIT
|
LOOP     |
    BUILD CHECK WORD, TRANSFER TO VITAL DRIVER
    |
    BUILD $\overline{\text{CHECK}}$ WORD, TRANSFER TO VITAL DRIVER
    |
    END OF TIME LIMIT ? - <<EXIT
    |
    EXECUTE ? - INITIALIZE EXECUTION TIME, CONTINUE
    |
    CONTINUE
|
GO TO DIAGNOSTIC DIAGNOSTIC
|
TEST DISPLAY & OUTPUT PORTS
|
PERFORM SIGNATURE ANALYSIS ON MEMORY
|
SEND TEST RESULTS TO VITAL TIMER*
|
TEST KEYBOARD INPUT
|
INPUT ? - GO TO KEYBOARD PROGRAM
|
REPEAT DIAGNOSTIC

FLOW CHART TABLE-continued

KEYBOARD PROGRAM

INITIALIZE REGISTERS

TRANSFER KEYBOARD ENTRY INTO [MESSAGE STORE]

TRANSLATE MESSAGE INTO DISPLAY FORMAT

TEST DISPLAY, STORE RESULT IN [DISPLAY TEST]

TRANSFER MESSAGE TO DISPLAY

LOCK OUT KEYBOARD ENTRY

GO TO PROCESS MESSAGE

PROCESS MESSAGE

TEST PORTS, STORE RESULT IN [PORT TEST]

DECODE MESSAGE BY TABLE LOOK-UP

SET BITS IN GROUP & MAIN PORTS

INITIALIZE TIME LIMIT

CHECK WORD LOOP

GET MESSAGE, ADD [PORT TEST]

STORE IN [CHECK]

READ PORTS, GENERATE SIGNATURE

GET DELTA FOR SIGNATURE BY TABLE

ADD TO [CHECK], TRANSFER TO VITAL DRIVER

READ DISPLAY, STORE IN [CHECK]

READ PORTS, GENERATE DIVERSE SIGNATURE

GET ECHO DELTA FOR DIVERSE SIGNATURE

ADD TO CHECK, ADD [DISPLAY TEST] TO CHECK

TRANSFER TO VITAL DRIVER

END TIME LIMIT ? - << EXIT

EXECUTE ? - INITIALIZE EXECUTION TIME, CONTINUE

CONTINUE

GO TO DIAGNOSTIC

PORT TEST P = R4

TEST VITAL + FLAG

TURN OFF VITAL +

DELAY

CHECK VITAL + FLAG

START TEST +

LOAD φ 1 IN PORT BYTE

INITIALIZE LOOP COUNTER

LOOP

FLOW CHART TABLE-continued

CHECK VITAL + FLAG

DELIVER PORT BYTE

DELAY

READ PORT, COMPLEMENT

PORT = φ ? - ERROR -

INCREMENT CHECK WORD

SHIFT RIGHT

PORT = φ ? - << EXIT

SHIFT LEFT

DECREMENT LOOP COUNT

LOOP COUNT = φ ? - ERROR -

CONTINUE LOOP

END LOOP

END TEST +

RETURN TO MAIN PROGRAM

*OUTPUT TO VITAL TIMER IS A SINGLE UNCOMPLEMENTED BYTE. VITAL TIMER RESPONDS BY GENERATING A DYNAMIC OUTPUT AT A FREQUENCY DIFFERENT FROM THE FREQUENCY THAT PRODUCES VITAL +. THIS OUTPUT INDICATES SYSTEM AVAILABILITY. IT IS NOT VITAL.

What is claimed is:

1. A vital digital control system with keyboard inputs for activating at least one output device in response to a manual keyboard selection of a sequence of a predetermined number of operation instructions, comprising:
    keyboard encoder means for generating the operation instructions in the form of multi-digit keyboard words;
    vital decoding means coupled to said keyboard encoding means for identifying said keyboard words and for producing message words, diverse output words and diverse display words based on said keyboard words, and display echo words based on said display words;
    display means coupled to said decoding means for displaying a representation of said display words;
    said vital decoding means including means for sequentially producing diverse multi-bit checkwords based on predetermined words generated by said system indicative of system performance, said predetermined words including said message words, said display words, and said display echo words in response to receipt of said keyboard words, and means for checking that successive of said checkwords are diverse, said checking means including, means for comparing each generated checkword to a predetermined constant multi-bit pattern, and for producing a validation signal if sequential ones of said checkwords are complementary and corresponding to said constant multi-bit pattern, said vital decoding means activating the output device in accordance with the keyboard instructions only if said validation signal is produced.

2. A system according to claim 1 wherein said vital decoding means comprises:

a central processing unit (CPU) for producing said checkwords, and for producing at least one address output word and at least one command output word based on said keyboard words, said CPU having a display output port for applying said display output word to said display means, a display echo input port coupled to said display output port for receiving said display echo word, a checkword output port for applying said sequentially generated complementary checkwords to said comparing means, at least one address output port and at least one command output port, said CPU applying said address and command output words respectively at said at least one address output port and said at least one command output port based on the keyboard words.

3. A system according to claim 2, further comprising:
said CPU having an addressable memory in which is stored a plurality of normalization words each of which corresponds to a particular address of said memory;
said CPU producing said checkwords based additionally on a selected normalization word obtained by addressing said memory by a predetermined one of said predetermined words produced by said system;
whereby only checkwords corresponding to said constant multi-bit pattern are generated in the event of valid system operation, resulting in the provision of said validation signal.

4. A system according to claim 3, further comprising:
said keyboard means successively generating diverse pairs of address keyboard words and diverse pairs of command keyboard words;
said vital decoding means producing diverse pairs of address display words, command display words, address display echo words and command display echo words based on said address and said command message words;
wherein the sequential diverse checkwords are produced by the CPU based additionally on the address and the command output words, and the address and the command keyboard words.

5. A system according to claim 4 further comprising:
said CPU having an address echo input port and a command echo input port respectively coupled to said address and said command output ports;
said vital decoding means comprising an address display output port and a command display output port respectively coupled to address and command display echo input ports;
isolation means for coupling the respective CPU output port of the respective CPU echo input port with a predetermined shift, said checking means setting the lowest order output bit, and cyclically reading output to input and writing input to output until the lowest order output bit is again set, said checking means further recording the number of cycles employed to produce a corresponding port test word;
wherein the checkwords produced by the CPU are additionally based on said port test word.

6. A system according to claim 5 further comprising:
said CPU having a plurality of address output ports and a plurality of command output ports, selected groups of said address and said command output ports having the respective address and command words applied thereto, each of said output ports including a predetermined number of identity bits in addition to address and command bits respectively reserved for said address words and said command words;
a plurality of vital relays, each having a predetermined number of contacts, connected to said address and command bits of said output ports, one relay per bit;
means for enabling the actuation of only the relays associated with selected groups of said address and said command output ports, depending on the keyboard instructions, actuation of the relays associated with the selected ports only occuring in the presence of said validation signal.

7. A system according to claim 6 further comprising:
means for producing a port signature word based at least on the output and identity of each of the display, address and command output ports by means of a cyclic redundancy check in which a serial stream of port bits from each said output ports is divided by a selected polynomial, said port signature word corresponding to the remainder of said division;
wherein the checkwords produced by the CPU are additionally based on said port signature word.

8. A system according to claim 7 further comprising:
said display means including means for producing an execute word based on a visual verification by an operator that the displayed display output words correspond in fact to the manually selected keyboard instructions, said execute word enabling the execution of the selected command operation;
wherein said checkwords produced by the CPU are additionally based on said execute word.

9. A system according to claim 8 further comprising:
means for multiplexing selected CPU address and command output ports, and selected bits of each selected port, said multiplexing means including,
a main port relay connected to each selected address and command bit, one relay per bit, of a selected multiplexed output port, each said main port relay having plural contacts, each contact connected at one side thereof to a first signal, and respectively connected at the other side thereof to an associated relay which is operable only in the event that the particular CPU output port has been selected and only if said validation signal is produced, each main port relay having a back contact which is connected in series with the back contacts of the other main port vital relays to produce a main port relay back check signal;
wherein the checkwords produced by said CPU are additionally based on said main port relay back check signal.

10. A vital digital control system for activating with keyboard inputs at least one output device in response to a manual keyboard selection of a sequence of a predetermined number of operation instructions, comprising:
keyboard encoder means for generating the operation instructions in a format defined by successive pairs of diverse multi-digit keyboard words, each pair of diverse keyboard words separated by a constant multi-bit framing sequence;
vital decoding means coupled to said keyboard encoding means for identifying each pair of keyboard words from said framing sequence and for producing diverse message and copy words, diverse output words and diverse display words based on said keyboard words;

display means coupled to said decoding means for displaying a representation of said display words;

said decoding means including, means for producing a display echo word based on said display words, means for producing diverse output signature words based on said output words, a memory for storing a table of checking normalization words to be used in formulating pairs of diverse multi-bit checkwords;

means of producing diverse diagnositic signature words based on the normalization words stored in said memory;

means for repetitively forming pairs of diverse checkwords based at least partially on predetermined arithmetic combinations of said diverse message and copy words, said display echo words, said output signature words, and said diagnostic signature words, means for comparing successive pairs of checkwords to determine that successive of said pairs are diverse and equal to a predetermined constant multi-bit pattern, means for generating a validation signal based on a determination by said comparing means that said checkwords are diverse and equal to said constant multi-bit pattern, and means for activating the at least one output device in accordance with the keyboard instruction only in the presence of said validation signal.

11. A system according to claim 10, including plural output devices, wherein each sequence of keyboard instructions includes address instructions for selecting particular output devices to be operated, command instructions for identifying a particular operation to be performed by the selected output devices, and an execute instruction to commence the particular operation to be performed, and wherein said vital decoding means further comprises:

means for forming diverse address message and copy words, diverse command message and copy words diverse address output words, and diverse command output words based on the address keyboard words and the command keyboard words produced by said decoding means in response to said address and command instructions, means for forming an execute word based on said execute instruction, port to which are respectively applied the display words, address output words, and command output words, a display echo input port, and address echo input port, and command echo input port, isolation means for respectively coupling said display output port, said address output port and said command output port to said display echo input port, said address echo input port and said command echo input port with a predetermined bit shift, means for setting a lowest order output bit in said display, address and command output ports and respectively cyclically reading output to input and writing input to output until the lowest order output bit of each output port is again set, said decoding means further recording the number of cycles employed to produce corresponding port test words, wherein said diverse checkwords are additionally based on arithmetic combinations of said display, address and command port test words and said execute instruction.

12. A system according to claim 11, wherein said means for producing said diagnostic signature further comprises:

first cyclic redundant check means for forming a first serial data stream based on said normalization words and for dividing said first serial data stream by predetermined polynomials to produce unique remainders to be used as said diagnostic signature words.

13. A system according to claim 12 wherein said means for producing said diverse output signature words comprises:

second cyclic redundant check means for producing plural second serial data streams based on the address output words and the command output words, and for dividing said second serial data streams by predetermined polynomials to produce unique remainders to be used as said output signature words.

14. A system according to claim 13, in which said diverse address message and copy words and said diverse command message and copy words are formed by pairs of complementary words in which the ones and zeroes are reversed, wherein said means for generating said checkwords comprises:

means for forming a true address checkword based at least partially on the sum of the diagnostic signature word, the address message word, the address output port test word, the execute word, a first address output port signature word based on cyclic redundant division of the address output word by a first polynomial, and a normalization word derived from said memory by using the address display echo word as a memory table look-up address;

means for forming a copy address checkword based at least partially on the sum of the stored diagnostic signature, the display port test word, the address copy word, a diverse address output port signature word based on cyclic redundant division of the address output word by a second polynomial different than said first polynomial, the execute word, and a normalization word derived from said memory by using the address copy word as a memory table look-up address;

means for forming a true command checkword based at least partially on the sum of the true address checkword, the command message word, the command output port test word, a command output signature word based on cyclic redundant division of the command output word by a third polynomial, the execute word, and a normalization word derived from said memory by using the command display echo word as a memory table look-up address; and means for forming a copy command checkword based at least partially on the sum of the copy address checkword, the command copy word, the command display port test word, a diverse command output port signature based on cyclic redundant division of the command output word by a fourth polynomial different than said third polynomial, the execute word, and a normalization word obtained from the memory by using the command copy word as a memory table look-up address;

wherein the true and copy command checkwords are multi-digit complementary words having reversed ones and zeroes.

15. A system according to claim 14 further comprising:
   said CPU having a plurality of address output ports and a plurality of command output ports, selected groups of said address and said command output ports having the respective address and command output words applied thereto, each of said output ports including a predetermined number of identity bits in addition to address and command bits respectively reserved for said address words and said command words, said identity bits included in the serial data streams produced by said second cyclic redundant check means;
   a plurality of vital relays, each having a predetermined number of contacts, connected to said address and command bits of said output ports, one relay per bit;
   means for enabling the actuation of only the relays associated with selected groups of said address and said command output ports, depending on the keyboard words from said keyboard encoder means, actuation of the relays associated with the selected ports only occuring in the presence of said validation signal.

16. A system according to claim 15 further comprising:
   means for multiplexing the output at selected CPU address and command ports, and selected bits of each selected port said multiplexing means including,
   a main port vital relay connected to each selected address and command bit, one relay per bit, of a selected multiplexed output port, each said main port vital relay having plural contacts, each contact connected at one side thereof to a first signal, and respectively connected at the other side thereof to an address or command vital relay which is operable only in the event that the particular CPU output port has been selected and only if said validation signal is produced, each main port vital relay having a back contact which is connected in series with the back contacts of the other main port vital relays to produce a main port relay back check signal;
   wherein the checkwords produced by said CPU are additionally based on said main port relay back check signal.

* * * * *